Feb. 3, 1931.  P. SPORN ET AL  1,791,471
RELAY AND METER TESTING AND CALIBRATING SWITCH AND KEY
Original Filed Sept. 17, 1924   2 Sheets-Sheet 1
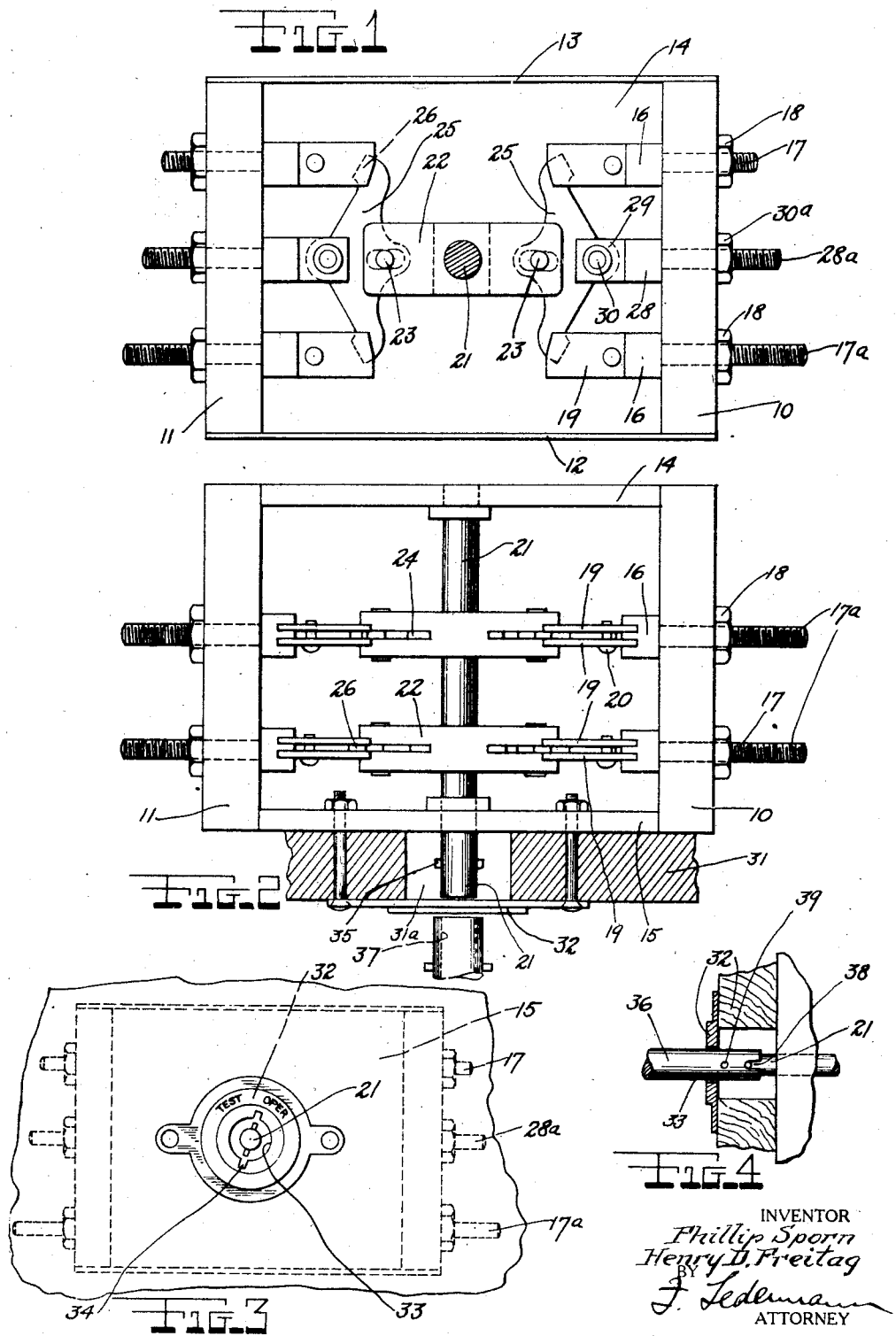

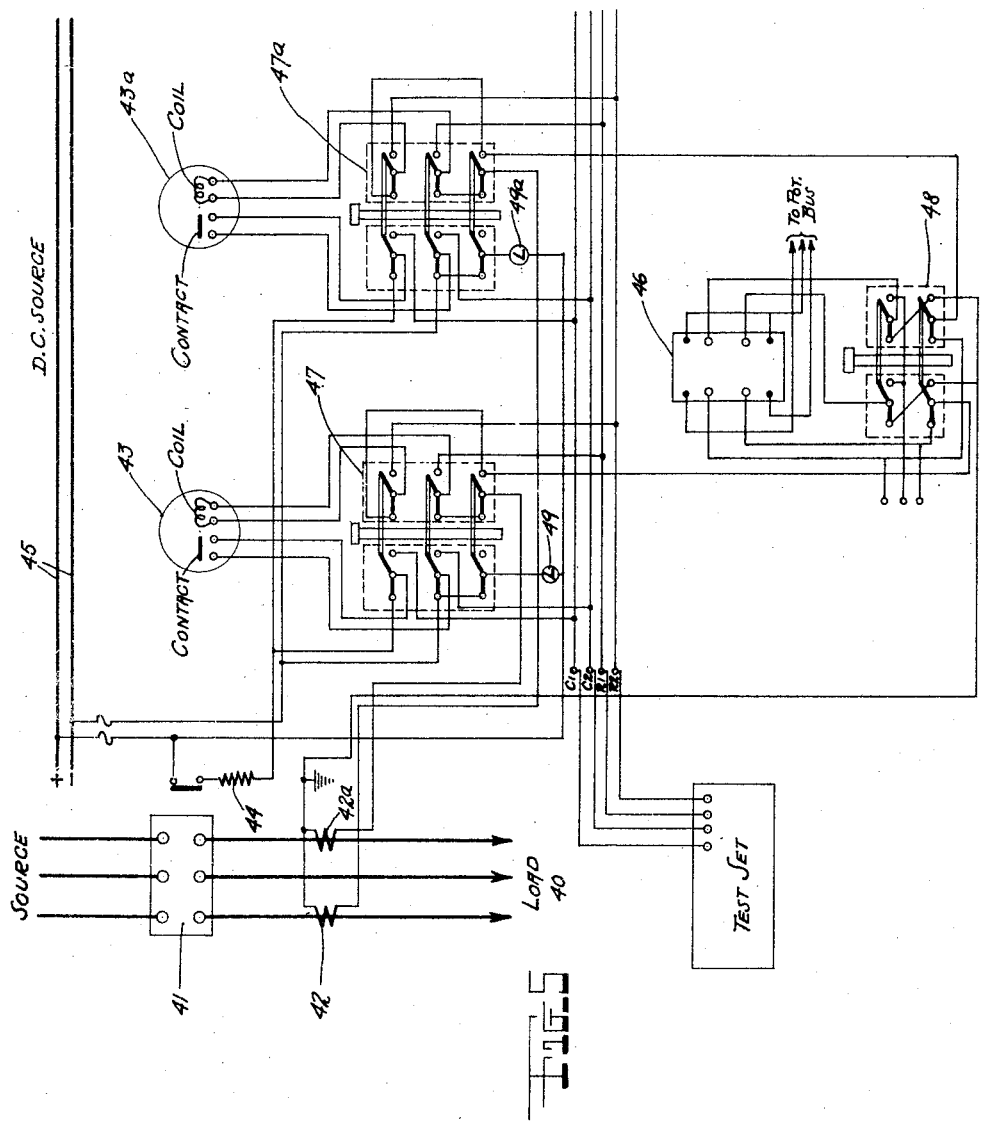

Patented Feb. 3, 1931

1,791,471

UNITED STATES PATENT OFFICE

PHILIP SPORN, OF BROOKLYN, AND HENRY D. FREITAG, OF LYNBROOK, NEW YORK

RELAY AND METER TESTING AND CALIBRATING SWITCH AND KEY

Application filed September 17, 1924, Serial No. 738,272. Renewed May 9, 1928.

The main object of this invention is to provide a relay or meter calibrating switch and key by means of which the contact circuits and operating coil circuits of the relay or meters are separated from the normal power circuit connected to these contacts or operating coils, and are thrown over to a group of testing busses that will make it possible to send any predetermined value of current or potential thru the operating coils and observe the operation or registration of the meter or relay.

Another object is to provide a switch whereby load adjustments and testing of the relay can be made with the relay in the operating position, the relay not being thrown into the test position until everything else such as the timer and other auxiliary testing apparatus is ready thus resulting in a minimum loss of protective value of the relay.

Another object is to provide for testing such meters and relays a switch which may be mounted in back of the board but which may be operated from the front of the board.

Another object is to provide a switch as above-mentioned having means whereby the meter or relay cannot be left in the test position after completion of the test, said means making it necessary that the meter or relay be connected back again into the operating position before the testing key can be withdrawn.

Another object is to provide an arrangement, in combination with a lamp in the circuit, for indicating the condition of the relay circuits.

Another object is to provide a switch as above-mentioned having its poles arranged compactly in groups opposite each other to call for a minimum of space in back of the board or panel.

The above and other objects will become apparent in the description below.

Figure 1 is an end section elevational view of the improved switch.

Figure 2 is a top plan view of the same with the cover removed.

Figure 3 is a front elevational view of the switch installed on a panel.

Figure 4 is a partially sectioned elevational view, showing the means for operating the shaft of the switch.

Figure 5 is a typical three-phase circuit diagram, showing a testing arrangement employing the switch according to the invention.

Referring in detail to the drawing, the numerals 10 and 11 indicate the side walls of a box-like container. These side walls are connected by panel members 14 and 15, and the lower edge is covered by a bottom 12 and the upper edge by a cover wall 13. Spaced-apart rectangularly formed lugs 16 arranged in pairs are mounted on the interior surface of the walls 10 and 11. The lugs 16 which are mounted at the upper end of the box-like container have threaded studs 17 thereon which pass thru the thickness of the walls 10 and 11 and project somewhat beyond the surface of these walls. The lower lugs 16 have similar studs 17a which are threaded thruout their length and pass thru the walls 10 and 11 and project from the exterior surface a greater distance than the studs 17. Each of these lugs 16 has vertical recesses therein in which the ends of resilient fingers 19 are mounted. These fingers 19 are used in pairs, a pair on each lug, and are spaced-apart mutually. A screw 20 engages each pair of these fingers and is adapted to vary the distance between the fingers to a limited extent. A shaft 21 is rotatably journalled between the panels 14 and 15 and in such a position that the lugs 16 and fingers 19 are grouped around said shaft in symmetrical alignment. On said shaft 21, a pair of blocks 22 are rigidly secured and are provided with openings at both their ends thru which pins 23 pass and transverse slots 24. Blades 25 are rotatably supported on the pins 23 and are movable in the slots 24. These blades 25 have extensions 26 which are adapted to move into the spaces between the pairs of fingers 19. The positions of these extensions 26 are such that when the blades are in the position shown in Figure 1, said extensions will register between the fingers of both the top and bottom pairs of fingers, as illustrated in the said figure. These blades 25 are supported between ears 29 which are mounted on lugs 28, the latter having threaded studs 28a thereon which pass thru the walls 10 and 11 of the box-like structure and project outwardly and are of such a length as to be intermediate between the studs 17 and 17a of the lugs 16. The studs 17 and 17a are rigidly retained in place by the nuts 18 and the stud 28 is similarly secured in position by nuts 30a. The ears 29 are provided to serve as supports for pivot studs 30 on which one side of the blades 25 are rotatably mounted.

The box-like structure containing the switch mechanism is mounted on the back of a panel board 31 which is provided with an orifice 31a in which the extending end of the shaft 21 is housed, the projecting length of the shaft being less than the thickness of the panel 31. The shaft 21 has near its ends a pin 35, the ends of which project diametrically. The hole or orifice in the panel 13 is covered by an escutcheon plate 32 which is preferably provided with a raised annular face on which the word "Test" and the abbreviation for the word "Operation" are inscribed. An opening 33 passes concentrically thru the escutcheon plate and communicates with the orifice 31a, and this opening is provided with a pair of diametrically opposed slots 34 which extends angularly with respect to the vertical (Fig. 3). The abbreviation for the word "Operation" is inscribed above the upper slot 34. The word "Test" is also inscribed on escutcheon member 32 at the same angle on the opposite side of the vertical center line. A key having any desired shape of handle is used in actuating the blocks 22 and shaft 21 and consists of a bar 36 circular in cross section and being bored out at one end to a proper diameter to allow said end to be slipped over the shaft 21, said bore being indicated by the numeral 37. The wall at the bored end of the bar 36 is provided with radially extending slots 38 which are adapted to receive the projecting ends of the pin 35. In order to lock the bar 36 in coupled position with the shaft 21 when said shaft has been rotated to the position indicating operation, a pin 39 is provided. This pin extends diametrically across the bar 36 and projects somewhat from both sides, the projecting ends being adapted to be passed thru the slots 34 in escutcheon plate 31 when the bar 36 is being coupled to the shaft 21 by slipping the slotted portions 38 over the pin ends 35.

The only portion of this switch mechanism exposed to view is the face of the escutcheon member 32 upon which the words "Test" and "Operation" appear. When the key bar 36 is inserted into place, the circuit is in operation, as the slots face this angle to which the blades 25 are turned. To close the test circuit, the key bar 36 must be rotated toward the position indicated by the word "Test", which operation rotates the shaft 21 and blocks 22 and causes movement of the blades 25 between one pair of lugs and away from the set on the opposite side of the lugs 28.

The testing of relays is accomplished by putting a definite but variable current thru the operating coils and timing or testing the relay operation. In the case of a meter the registration is observed by means of the so-called rotating standard.

In Figure 5 is shown the three-phase high-tension feeder 40 employing an oil switch 41, series current transformer 42 and 42a, protective relays 43 and 43a, trip coil of oil switch 44, D. C. source of tripping supply 45, watt-hour meter 46, relay test switches 47 and 47a, and meter test switch 48. The lamps 49 and 49a may be provided for the purpose above-mentioned.

With the testing switch arrangement shown in Figure 5, if a test is desired on relay 43, a test apparatus is connected to test busses C1, C2, R1 and R2 and the current adjustment made keeping the test switch in the normal or "operating" position. When all adjustments have been made the test switch is thrown into the "test" position and the timing of the relay taken, followed immediately by throwing the test switch back into the "operating" position. During the test period of relay 43, the circuit of relay 43a and of meter 46 has been undisturbed. Similarly, relay 43a or meter 46 can each be tested without disturbing the other relays or meters in the same current transformer circuit.

The general testing arrangement of our invention as exemplified by the apparatus shown in Fig. 5 is claimed in our divisional application Serial Number 500,180, filed December 5, 1930. The appended claims are directed to the novel switch construction of our invention as described above, and since many modifications and equivalents thereof will suggest themselves to those skilled in the art, we desire that the claims be given a broad interpretation commensurate with the scope of the invention within the art.

We claim:—

1. A device of the class described comprising a box-like structure, lugs mounted in said structure having recesses therein, fingers rigidly mounted in said recesses, said fingers being mounted in pairs on each lug, a shaft rotatably journalled in said structure, blocks rigid with said shaft, blades pivoted between the upper and lower sets of fingers and adapted to be moved and engaged by said blocks, and means for turning said shaft to rotate said blades.

2. A device of the class described comprising a hollow box-like structure having a completely enclosed chamber, lugs mounted in the end walls of said structure, threaded studs on said lugs passing thru the end walls of said structure and being secured in place therein, nuts engaging said studs for locking the lugs in place, said lugs being mutually spaced-apart, fingers having one of their ends secured in the recesses of the lugs, the opposite ends of said fingers being flexibly free, said fingers being mounted in pairs on each lug, a shaft rotatably journalled in said structure, blocks rigid with said shaft, blades pivoted between the upper and lower sets of fingers and adapted to be moved and engaged by said blocks, and means for turning said shaft to rotate said blades.

3. A device of the class described comprising a hollow box-like structure, lugs projecting inwardly from the end walls of said structure, said lugs having spaced-apart parallel recesses therein, the recesses extending vertically in the lugs, resilient fingers having one of their ends secured in the recesses, said lugs being mutually spaced-apart in the structure, the fingers being mounted in pairs on each lug, a shaft journalled in the top and bottom of said structure, blocks keyed to said shaft, said blocks having recesses on both ends thereof, pins passing thru said recessed ends, blades pivotally mounted between the upper and lower sets of fingers and being pivotally engaged in the blocks and moved by rotation of said blocks, and means for turning said shaft to rotate said blades.

4. In a switch of the class described, contact fingers, an oscillatable shaft, and a contact blade pivotally and permanently secured to said shaft and pivotally and permanently secured to one of the fingers.

5. In a switch of the class described, upper, lower and intermediate contact fingers, an oscillatable shaft, and a contact blade pivotally and permanently secured to said shaft and pivotally and permanently secured to the intermediate finger.

6. A device of the class described, comprising a box-like structure, sets of oppositely disposed upper, lower and intermediate contact fingers mounted in corresponding walls of said box, the fingers of each set lying in a common plane and having means extending externally of the box for external connection, a shaft rotatably journaled in said box between sets of fingers, two contact elements pivotally and permanently secured to and moved by said shaft and pivotally and permanently secured to the respective intermediate fingers of the sets and adapted for engagement with the corresponding upper and lower fingers of a set, and means for oscillating said shaft.

7. A device of the class described, comprising a box-like structure, sets of oppositely disposed upper, lower and intermediate contact fingers mounted in corresponding walls of said box, the fingers of each set lying in a common plane and having means extending externally of the box for external connection, a shaft rotatably journaled in said box between sets of fingers and substantially in the plane of the intermediate fingers with axis of rotation at right angles to the plane of said sets, two contact elements pivotally and permanently secured to and moved by said shaft and pivotally and permanently secured to the respective intermediate fingers of the sets and adapted for engagement with the corresponding upper and lower fingers of a set, and means for oscillating said shaft.

8. A device of the class described, comprising a box-like structure, sets of oppositely disposed upper, lower and intermediate contact fingers mounted in corresponding walls of said box, the fingers of each set lying in a common plane and having means extending externally of the box for external connection, a shaft rotatably journaled in said box between sets of fingers, a block of insulation material rigidly secured to the shaft, a pair of diametrically disposed contact blades pivotally mounted on said block and pivotally secured to the respective intermediate fingers, said blades being adapted to cooperate with the respective upper and lower fingers of a set, and means for oscillating said shaft.

9. A device of the class described, comprising a box-like structure, sets of oppositely disposed upper, lower and intermediate contact fingers mounted in corresponding walls of said box, the fingers of each set lying in a common plane and having means extending externally of the box for external connection, a shaft rotatably journaled in said box between sets of fingers, a block of insulation material rigidly secured to the shaft in the plane of the intermediate fingers, a pair of diametrically disposed contact blades pivotally mounted on said block and pivotally secured to the respective intermediate fingers, said blades being adapted to cooperate with the respective upper and lower fingers of a set, and means for oscillating said shaft.

10. A device of the class described, comprising a box-like structure, sets of oppositely disposed upper, lower and intermediate contact fingers mounted in corresponding walls of said box, the fingers of each set lying in a common plane and having means extending externally of the box for external connection, a shaft rotatably journaled in said box between sets of fingers and substantially in the plane of the intermediate fingers with axis of rotation at right angles to the plane of said sets, a block of insulation material rigidly secured to the shaft, a pair of diametrically disposed contact blades pivotally mounted on said block and pivotally secured to the respective intermediate fingers in the plane of the axis of said shaft, said blades being adapted to cooperate with the respective upper and lower fingers of a set, and means for oscillating said shaft.

11. An electric switch comprising a box-like chamber having two oppositely facing walls, each of said walls having insulatingly mounted thereon a plurality of distinct sets of contact members, each set of contact members comprising a central contact member and contact fingers lying on opposite sides of said central contact member, a contact blade associated with each set of contact members and pivotally mounted therebetween for oscillatory movement to alternately engage said central contact member and the contact fingers lying on either one or the other side of central contact member for controlling circuit connections therebetween, a rotatable shaft extending longitudinally between the oppositely facing walls, and means insulatingly connecting said shaft and said contact blades to simultaneously move the contact blades cooperating with the sets of contact fingers on both walls from one contact position to the other upon rotating said shaft.

In testimony whereof we affix our signatures.

PHILIP SPORN.
HENRY D. FREITAG.